United States Patent [19]

Smith et al.

[11] Patent Number: 5,572,397
[45] Date of Patent: Nov. 5, 1996

[54] COMBINED OVERVOLTAGE STATION PROTECTOR APPARATUS HAVING MAINTENANCE TERMINATION AND HALF RINGER CIRCUITRY

[75] Inventors: Thomas J. Smith, Bay Shore; James Chermak, Huntington, both of N.Y.

[73] Assignee: TII Industries, Inc., Copiague, N.Y.

[21] Appl. No.: 342,629

[22] Filed: Nov. 21, 1994

[51] Int. Cl.$^6$ .................................................. H02H 9/00
[52] U.S. Cl. .............................. 361/119; 361/56; 361/91; 361/111
[58] Field of Search ............................... 361/56, 91, 111, 361/118, 119; 379/399

[56] References Cited

U.S. PATENT DOCUMENTS

| | | | |
|---|---|---|---|
| 4,907,120 | 3/1990 | Kalzmarek | 361/119 |
| 5,175,662 | 12/1992 | DeBalko | 361/119 |
| 5,224,013 | 6/1993 | Pagliuca | 361/119 |
| 5,291,553 | 3/1994 | Smith | 379/399 |

*Primary Examiner*—Jeffrey A. Gaffin
*Assistant Examiner*—Stephen Jackson
*Attorney, Agent, or Firm*—Martin Sachs

[57] ABSTRACT

A combined overvoltage station protector apparatus with a maintenance termination and a half ringer circuit arrangement combined with an overvoltage surge arrester mounted in a single housing includes a hollow housing divided into a first section and a second section, with each having a top surface and an open bottom. A pair of input line terminals and a ground terminal are fixed to the top surface and extend inside the hollow housing first section. A pair of output line terminals are affixed in the top surface of the second section and extend within the hollow housing. A printed circuit board, disposed within the second section of the housing provides for interconnecting the electrical circuit components, which form the maintenance termination and the half ringer circuit arrangement. A housing assembly, disposed within the hollow housing first section, is connected to the housing ground terminal and is adapted to removably receive a surge arrester therein. The surge arrester is a three-terminal device, having at least a pair of electrode terminals and a ground terminal, which is in electrically conductive contact with the housing ground terminal. Each one of the electrode terminals is in electrically conductive contact with one of the pair of line terminals.

15 Claims, 5 Drawing Sheets

5,572,397

COMBINED OVERVOLTAGE STATION PROTECTOR APPARATUS HAVING MAINTENANCE TERMINATION AND HALF RINGER CIRCUITRY

BACKGROUND OF THE INVENTION

1. Field of the Invention

The present invention relates to overvoltage protection for communication systems, and in particular, to a combined overvoltage station protector apparatus having maintenance termination and a half ringer circuit arrangement disposed therein.

2. Discussion of the Relevant Art

The art abounds with many overvoltage protection systems utilized on telecommunication lines to protect them from overvoltages, such as caused by lightening strikes, typical of which is U.S. Pat. No. 5,224,013, issued to Emanuel J. Pagliuca on Jun. 29, 1993. One attempt to miniaturize the known devices, and include therein a maintenance termination unit (MTU), is disclosed in a miniature device described in U.S. Pat. No. 5,175,662, issued to Debalko, et al. on Dec. 29, 1992. However, the unit disclosed therein relates to a module utilizing an eight pin plug generally used in a telephone central terminal, which may readily be plugged in and out of a protection console. The device provides for the disconnection of the customer's line from the telephone network lines in order to determine if the problem is on the customer's side of the line or on the network side of the telephone line equipment.

Overvoltage protection devices are utilized to short the incoming signals to ground when an excessive voltage or current appears on the telephone line. Typically these units are mounted in separate housings proximate to the customer's home.

The present invention advances the state of the art by further combining the overvoltage protection with maintenance termination and half ringer circuitry.

The present invention includes all the features disclosed in the prior art, and in addition includes the known circuitry for a half ringer, which provides a minimal load to the telephone line at all times for testing purposes.

Therefore, it is the primary object of the present invention to reduce the size and number of packages that are required to provide the three separate functions together in a single housing.

It is another object of the present invention to provide a relatively small, reliable housing into which is placed overvoltage protection, maintenance termination and half ringer circuitry.

Other objects and advantages will become obvious to those knowledgeable in the art.

SUMMARY OF THE INVENTION

In accordance with the principles of the present invention, a combined overvoltage station protector apparatus having maintenance termination and a half ringer circuit arrangement together with an overvoltage surge arrester mounted in a single housing is disclosed. The apparatus includes a hollow housing divided into a first section and a second section, with each having a top surface and an open bottom. A pair of input line terminals and a ground terminal disposed therebetween are fixed to the top surface and extend inside the hollow housing first section, with the ground terminal being intermediate the pair of line terminals. A pair of output line terminals are affixed in the top surface of the second section and extend within the hollow housing second section. A printed circuit board is disposed within the second section of the housing and includes electrically conductive paths for interconnecting the plurality of electrical circuit components, which form the maintenance termination and the half ringer circuit arrangement. A housing assembly, which is affixed to the housing ground terminal within the hollow housing first section, is adapted to removably receive a surge arrester therein. The surge arrester is a three-terminal device, having at least a pair of electrode terminals and a ground terminal, which is in electrically conductive contact with the housing first section ground terminal. Each one of the electrode terminals is in electrically conductive contact with one of the pair of line terminals.

Back-up surge protectors are connected from each of the line terminals to ground. In case the primary surge tube arrester were to fail, protection would still be available.

The foregoing and other objects and advantages will appear from the description to follow. In the description, reference is made to the accompanying drawing, which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to accompanying drawing in which.

DESCRIPTION OF THE PREFERRED EMBODIMENT

Figure 1:
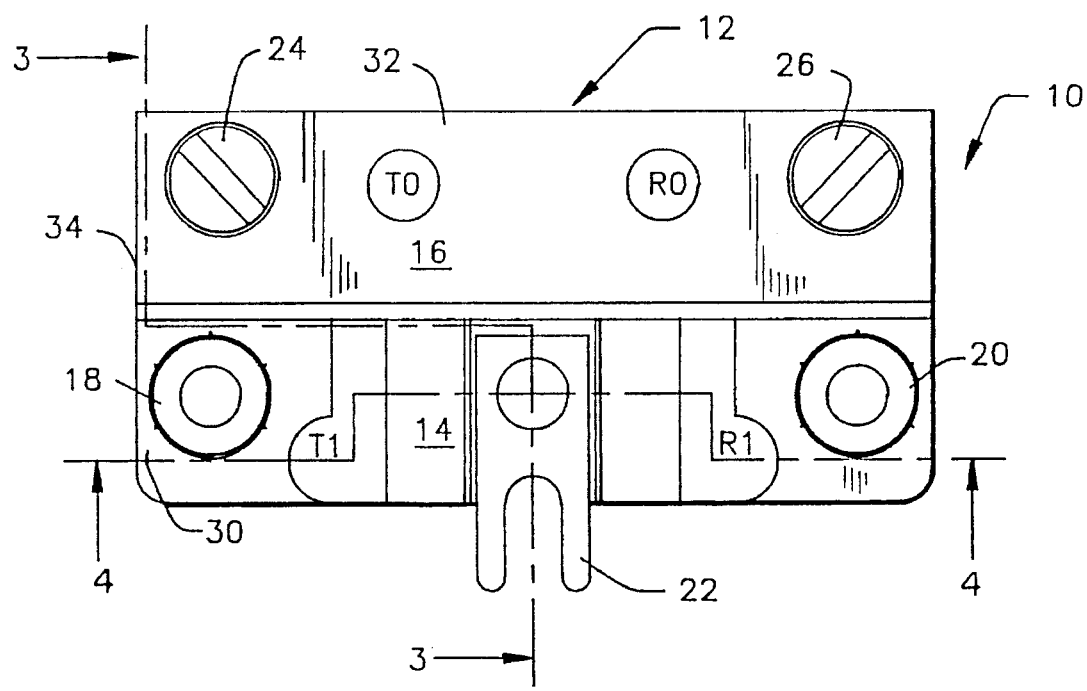
FIG. 1 is a top plan view of the combined overvoltage station protector apparatus with maintenance termination and half ringer circuitry disposed therein, according to the principles of the present invention.

Referring now to the figures, and in particular to FIG. 1, there is shown a top plan view of the combined overvoltage station protector apparatus 10, with maintenance termination and a half ringer circuit arrangement disposed therein, that has a non-conductive housing 12, which is divided into a first section 14 and a second section 16.

The first section 14 is seen to include a pair of line input terminals 18 and 20, to which is connected, in a conventional manner, the input telecommunication lines from the telephone company. Disposed between the terminals 18 and 20 is a ground terminal 22, which is connected to the system ground in a conventional manner.

The second section of housing 12 is seen to include two output terminals 24 and 26, to which the telephone wires going to the consumer are affixed in a conventional manner. For the convenience of the technician, the input terminals are indicated clearly with the tip input (TI) and ring (RI) input marked for convenience, as is the tip output (TO) and ring output (RO) terminals.

Figure 2:
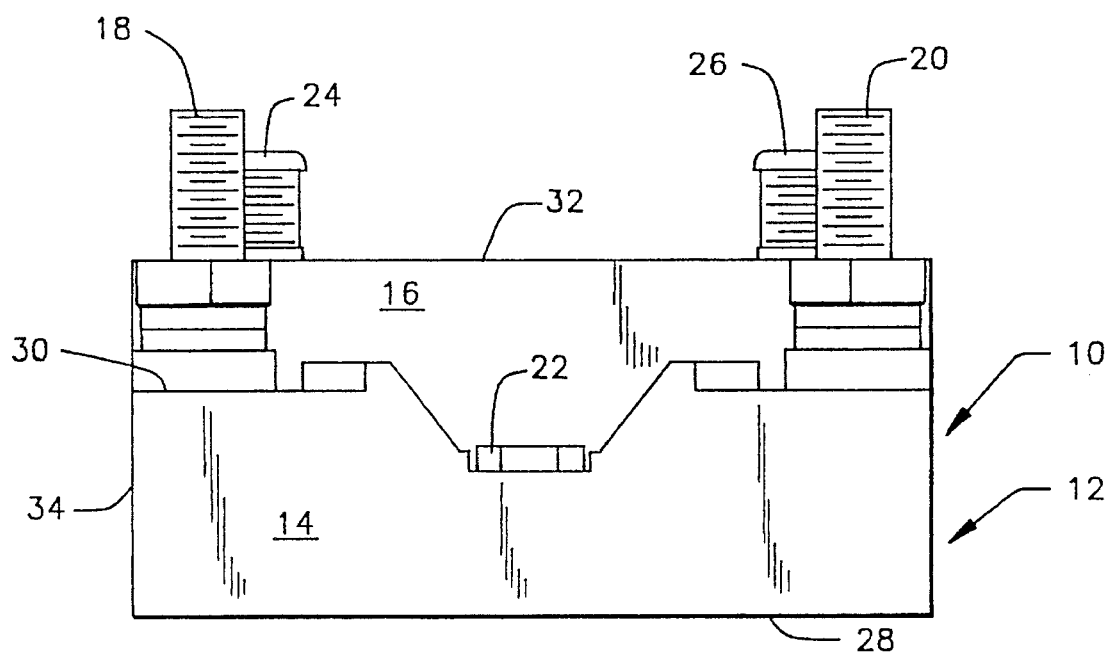
FIG. 2 is a front view in elevation of the apparatus shown in FIG. 1.

FIG. 2 is a front view in elevation of the combined apparatus 10 and is seen to include the elements described earlier with all of the terminals extending into the housing sections 14 and 16, where electrical connections may be made thereto in a conventional manner. The housing 12 is provided with an open bottom 28, so that access to the components disposed within the housing 12 is readily maintained. It also may be desirable to fill the housing with a potting compound 29 to seal the components from the atmosphere or utilize other mechanical means, e.g., a cover 31, etc.

All of the aforementioned terminals 18, 20, 24 and 26 and ground terminal 22 extend from the top surfaces 30 and 32 for the first section 14 and the second section 16 respectively, to the interior portion of the housing 12.

Figure 3:
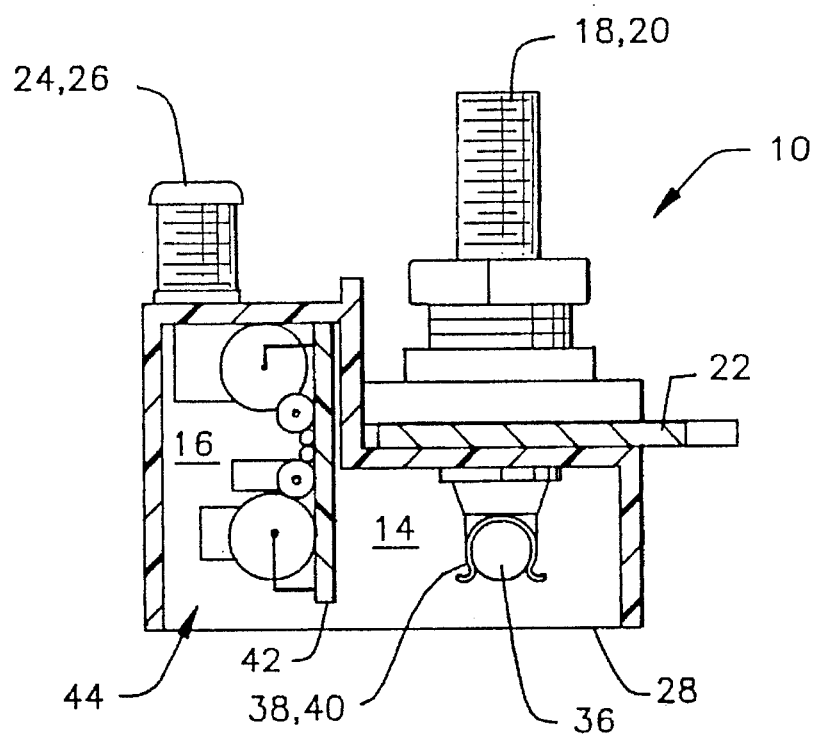
FIG. 3 is a side view in elevation of the apparatus shown in FIG. 1, essentially along the line 3—3, with the side wall removed so that the internal components and arrangement thereof may be seen.

FIG. 3 is a sightly reduced cross-sectional view in elevation of one end of the housing 12 for the combined over-voltage station protector apparatus having maintenance termination and a half ringer circuit arrangement disposed therein 10 with the left side panel 34 removed and extending essentially along the line 3—3 as shown in FIG. 1. Within the first section 14 is disposed a gas tube surge arrester 36, being retained by clips 38 and 40, which is shown and described in greater detail with regard to FIG. 4.

Disposed within the second section 16 of the housing 12 is a printed circuit board 42, which has disposed thereon a plurality of electrical components 44, which will be described in greater detail with regard to FIG. 7.

Figure 5:
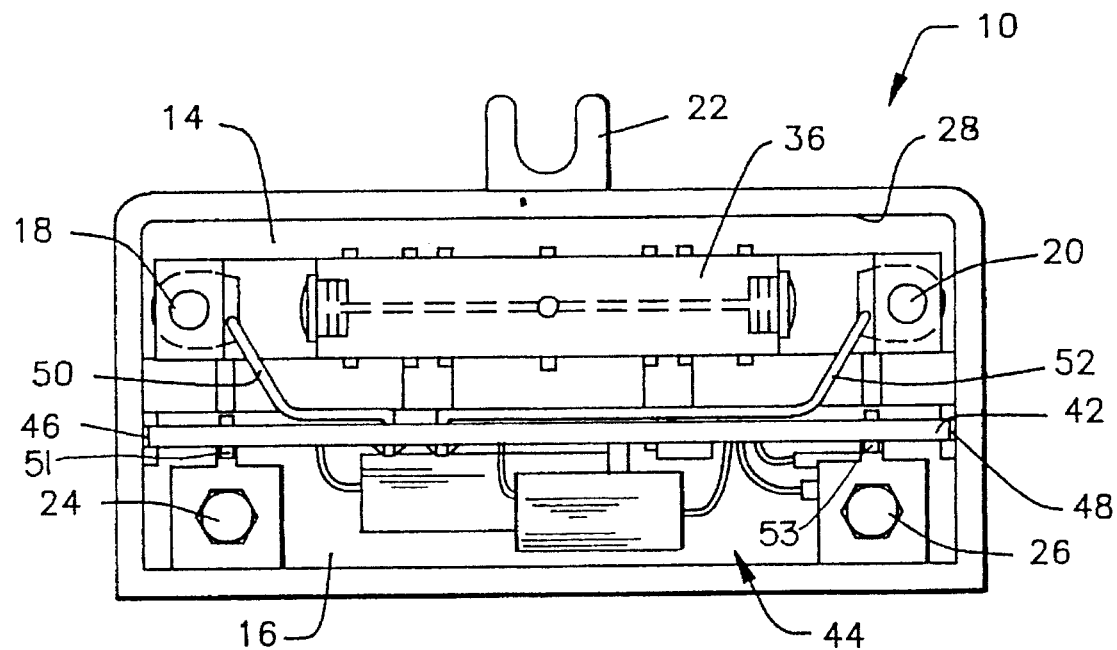
FIG. 5 is a bottom plan view of the apparatus shown in FIG. 1.

FIG. 5 is a bottom view of the combined apparatus 10, wherein the plurality of electrical components 44 are disposed on the printed circuit board 42 in the second section 16 of the housing 12. Channels 46 and 48 are provided in the side walls 50 and 52 of the housing 12, and are adapted to receive the printed circuit board 42 therein. Electrically conductive wires 50 and 52 are connected to the terminals 18 and 20 (tip input and ring input respectively), and 51 and 53 are connected to the terminals 24 and 26, respectively, thereby connecting the electrical pads where needed to the input line terminals and output line terminals 18, 20, 24, and 26, respectively, as required.

Figure 4:
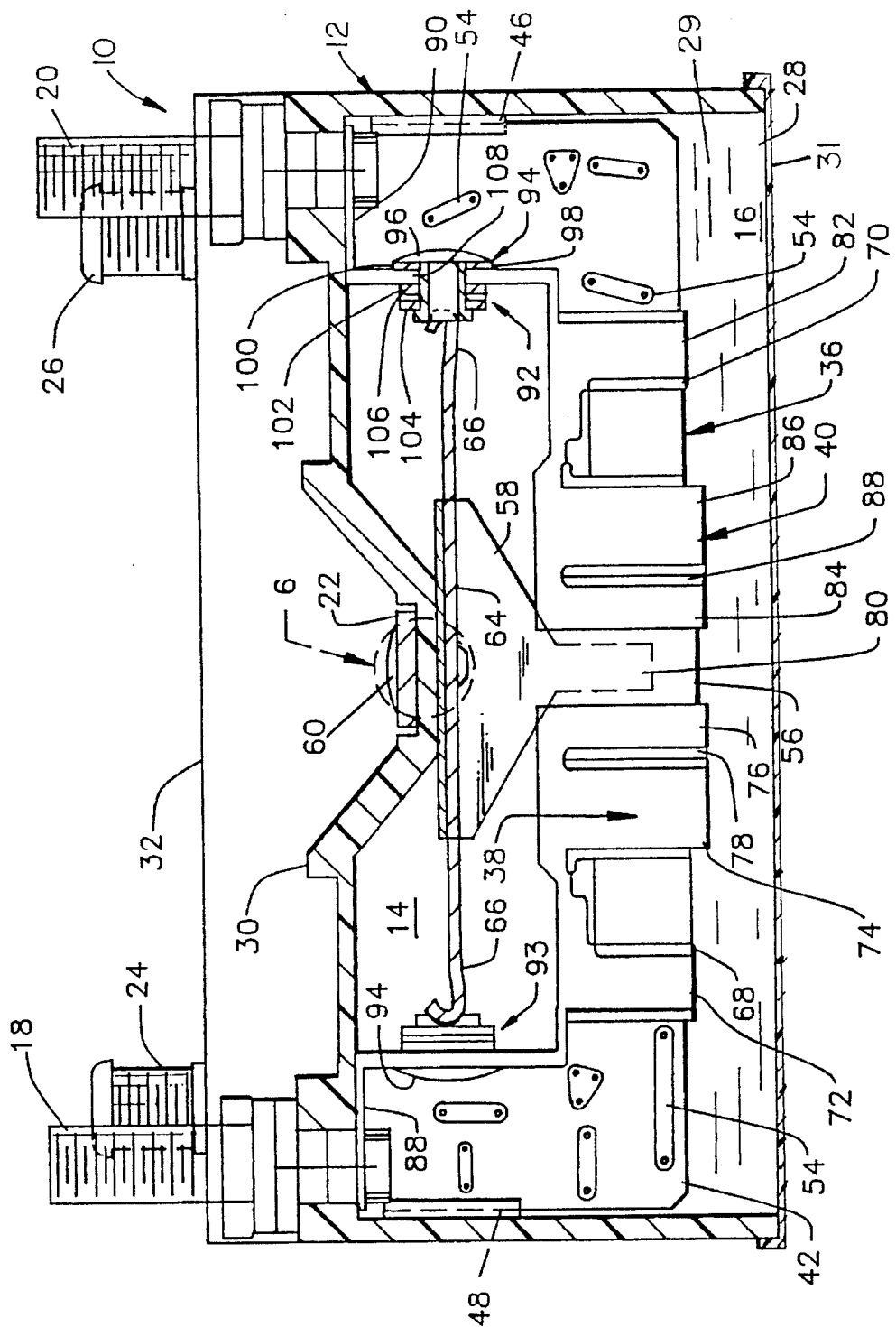
FIG. 4 is a greatly enlarged side view in elevation taken essentially along the line 4—4 shown in FIG. 1.
Figure 6:
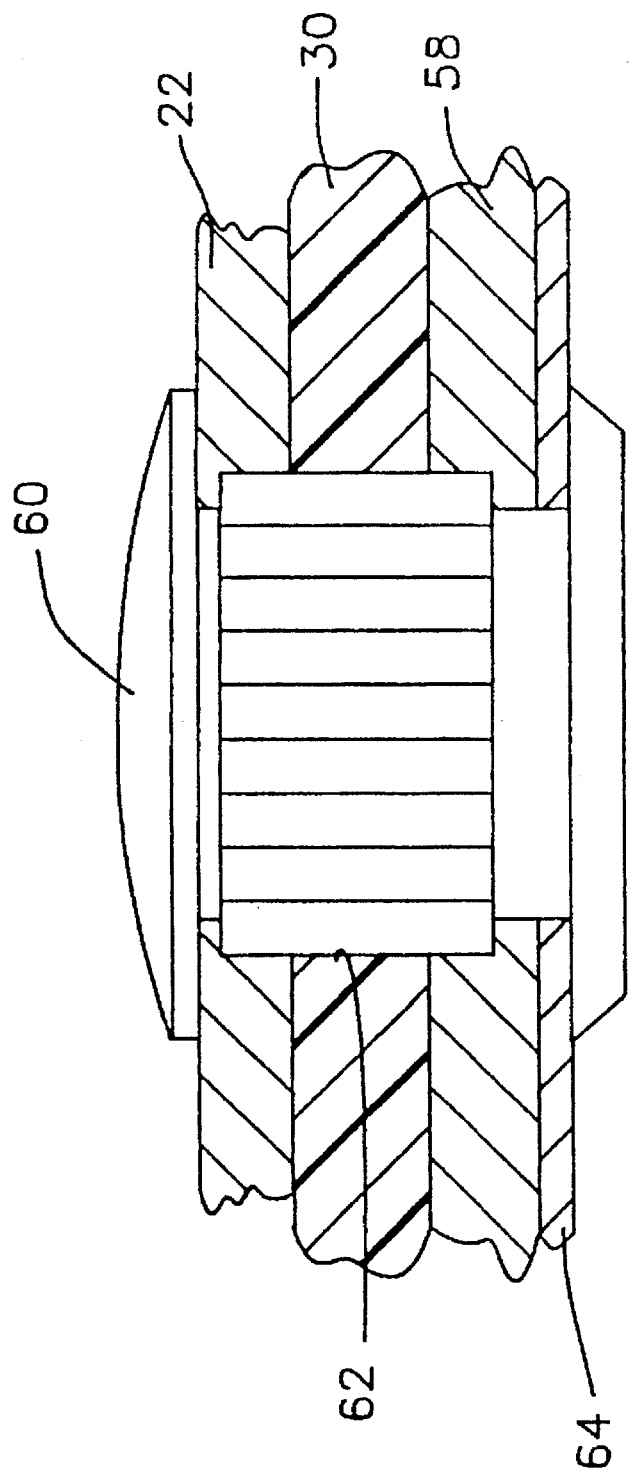
FIG. 6 is a greatly enlarged cross-sectional view of the area encompassed in the broken line shown in FIG. 4.

Referring now to FIG. 4, which is a greatly enlarged view taken essentially along the line 4—4 of FIG. 1. Since the electrical components 44 are on the opposite side of the printed circuit board 42, and the fact that the positioning of these components are simply a matter of design choice, we have not provided an accurate positioning and layout thereof, because it is believed that those knowledgeable in the art may readily provide for the arrangement of components pursuant to the electrical circuit diagram shown in FIG. 7. However, it is to be noted that in the arrangement as set forth herein, the only portion of the printed circuit board 42 that is visible in this view would be the electrically conductive pads 54, which appear on the printed circuit board 42. The circuitry for the maintenance termination and the half ringer is mounted on the printed circuit board 42 as stated earlier.

The gas tube surge arrester 36 is a three terminal device with a centrally disposed electrode 56 in electrically conductive contact with the ground clip 58, that in turn is in electrically conductive contact with rivet 60, which is in electrically conductive contact with ground terminal 22. Ground terminal 22 would normally be affixed to and in electrically conductive contact with the system ground. Rivet 60 is extended through an aperture 62 provided in the top surface 30 of the first section 14 of the housing 12 and also holds in place electrically conductive jumper 65 that is provided with extending curved arms 66 at both ends thereof. Thus, the rivet 60 forms a neatly tight package providing an electrically conducting connection to ground for the ground terminal 22, ground clip 58, and jumper 64, whose function will be explained hereinafter.

The gas tube surge arrester 36 has two active electrode terminals 68 and 70. Terminal 68 of the surge arrester 36 is adapted to be received into fingers 72 of clip 38, which has one end with additional fingers 74 and 76 thereon adapted to receive the body portion of the surge arrestor 36 therein and further includes a thermally sensitive insulator 78, disposed beneath the fingers 76 and 74 to prevent them from coming into electrically conductive contact with the central electrode (ground terminal) of the gas tube surge arrester. Should the surge arrester 36 overheat because of excessive current flowing, the electrode 68 of arrester 36 would be shorted to ground, via the clip 38 and the extending finger 80 of ground clip 58, which is in electrically conductive contact with the central electrode 56 of the surge arrester 36.

The configuration for holding the other electrode 70 of the arrester 36 is identical to that for holding electrode 70, and the fingers 82 of clip 40 with fingers 84 and 86 of clip 40 prevent it from coming into electrically conductive contact with the central electrodes 56 of the arrester 36 by the use of a thermal insulator 78 disposed beneath the fingers 84 and 86.

Clips 38 and 40 are provided with extending portions 88 and 90, which are affixed to terminals 18 and 20, respectively, in a conventional manner. At a convenient point along the extending portions 88 and 90, a back-up surge arrester 92 is affixed by means of a rivet 94. The back-up surge arrester 93 is affixed to bracket extending portion 88 in the same manner and is identical to the back-up surge arrester 92.

For the convenience and ease of understanding the construction of the back-up surge arresters 92 and 93, the cross-sectional view will be described in detail and it is to be understood that the back-up surge arrester 93 shown at the left hand side of the drawing is exactly the same as the back-up surge arrester 92 that is shown at the right hand side of the drawing.

Directly under the head 96 of rivet 94 is a hollow insulator 98, which extends through an aperture 100 provided in the extending portion 90 of clip 40. On the other side of the extending portion 90, two pieces of electrically conductive material 102 and 104 sandwich an insulator 106 therebetween. The insulator 106 has, in addition to a centrally disposed aperture, which is also provided in electrically conductive materials 102 and 104, preferably four through apertures. The insulator 106 is preferably fabricated from 12 to 14 mils thick of polyester film material known as Mylar manufactured by Dupont Corporation of Wilmington, Del.

Once assembled, the rivet 94 is inserted into the aperture 100 within the opening 108 of the hollow insulator 98 and then rolled over to affix the back-up surge arrester 92 to the extended portion 90 of the clip 40. The curved arms 66 of jumper 64 extend outwardly and come into electrically conductive contact with the electrically conductive material 104, therefore making the conductive material 104 sit at ground potential. The electrically conductive material 102 is in electrically conductive contact with the extending portion 90 of clip 38 and thus, when connected to the terminal 20 (or 18) provide a second path to ground (back-up) should the gas tube fail and not short to ground, e.g. if it were to become vented.

Figure 7:
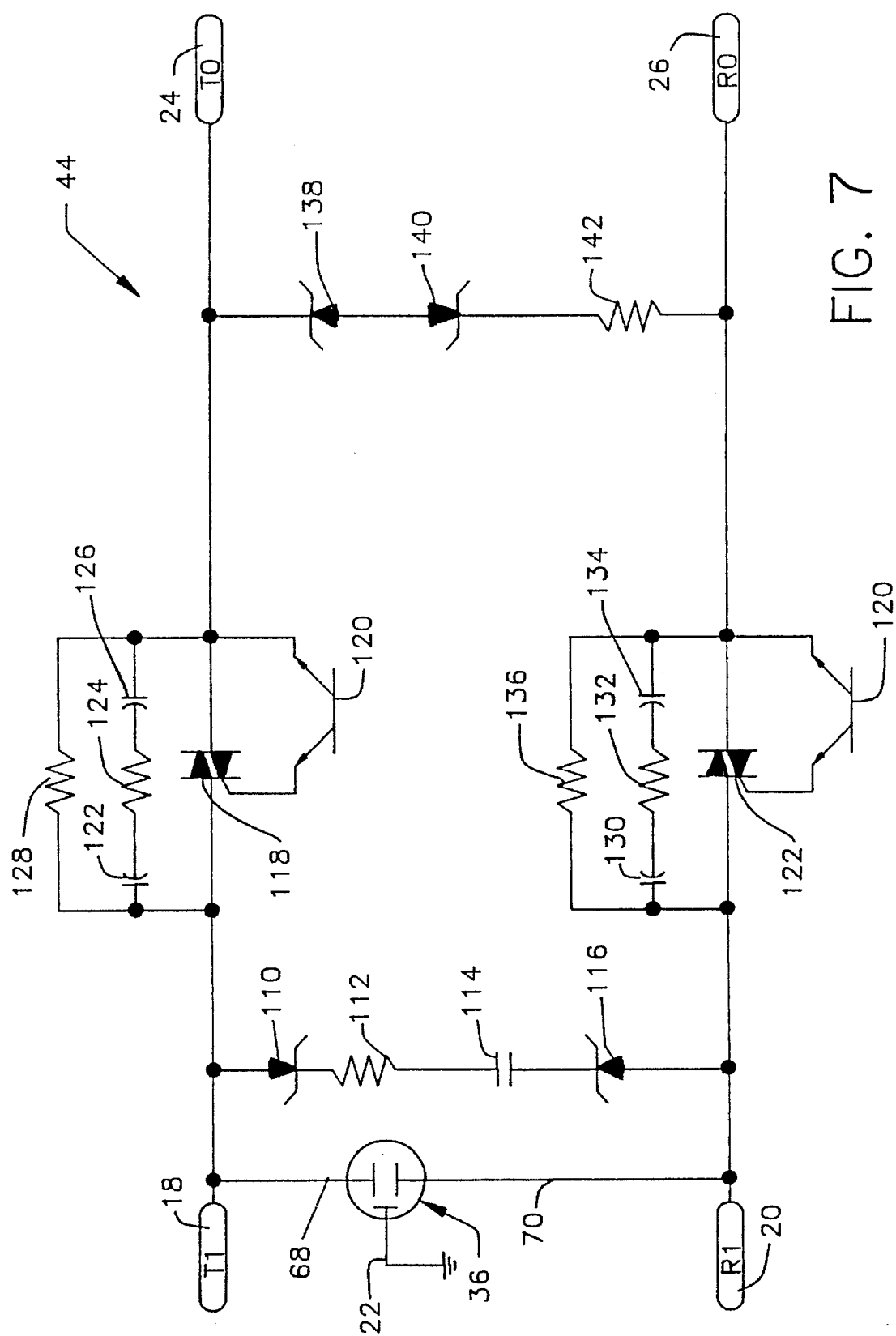
FIG. 7 is an electrical circuit schematic diagram of the components which are mounted on the printed circuit board disposed within the housing shown in FIG. 1.

Referring now to FIG. 7, which is an electrical circuit diagram of the overvoltage circuit protection, the maintenance termination and half ringer circuitry. Jumper wires 50, 52, 51 and 53 connected between terminals 18, 20, 24, and 26, respectively, are provided from the printed circuit board 42 to the respective terminals and have not been shown in FIG. 4 for convenience.

Connected from the tip input terminal 18 to the ring input terminal 20 in a series path is found a breakover diode (Zener diode) 110 with a resistor 112 connected to the diode 110 on one end and a capacitor 114 on the other end. The other end of the capacitor 114 is connected to a breakover diode (Zener diode) 116, which in turn has its other end connected to the ring input terminal 20. These Zener diodes 110 and 116 are oppositely poled so that an AC voltage of a prescribed polarity placed on tip input or ring input terminals would cause current to flow therethrough. In addition, the electrodes 68 and 70 of the surge arrester tube 36 are connected across terminals 18 and 20, respectively.

In the series path between terminals 18 (tip in) and terminal 24 (tip out), there is provided a bi-polar thyristor 118, with an associated trigger device 120. In a like manner, a bi-polar thyristor 122 and a trigger device 120 are connected between the ring input terminal (RI) 20 and the ring output terminal (RO) 26. A resistor and capacitor network consisting of a serially connected circuit connected across the bi-polar thyristor 118 is a capacitor 122, a resistor 124 and another capacitor 126, with resistor 128 being connected across the series path of the capacitor 122, 124 and 126. In a like manner, a series path consisting of a capacitor 130, a resistor 132 and a capacitor 134 is connected across the by-polar thyristor 122. Here again, the resistor 136 is connected across the series path of the capacitor 130, the resistor 132, and the capacitor 134, the purpose of which is to turn on the thyristors quickly in the event of dial pulses and to provide the pulsing that the network requires to identify the maintenance termination on the line.

A series path connected from the tip output terminal 24 to the ring output terminal 26 consists of a diode 138, a breakover diode (Zener) 140 oppositely poled and a resistor 142.

Hereinbefore has been disclosed a combined overvoltage station protector apparatus having maintenance termination and a half ringer circuit arrangement disposed therein, which is compact and suitable for use at the subscriber's telephone terminal. It will be understood that various changes in the details, material, arrangement of parts, and operating conditions, which have been herein described and illustrated in order to explain the nature of the invention, may be made by those skilled in the art within the principle and scope of the instant invention.

Having thus set forth the nature of the invention, what is claimed is:

1. A combined overvoltage station protector apparatus having maintenance termination and a half ringer circuit arrangement disposed therein, comprises in combination:

A. a hollow housing divided into a first section and a second section, each said section having a top surface;

B. a pair of input line terminals and a ground terminal disposed in said first section top surface extending inside said hollow housing first section, said ground terminal being intermediate said pair of line terminals;

C. a pair of output line terminals disposed in said second section top surface extending inside said hollow housing second section;

D. non-conductive printed circuit board means being disposed within said second section of said housing having;

a) a plurality of electrically conductive paths thereon, one of said conductive paths being connected to each of said input line terminals and each of said output terminals by electrically conductive means, one of said conductive paths being connected to said housing ground terminal, and b) a plurality of electrical circuit components forming said maintenance termination and said half ringer circuit arrangement;

E. holding assembly means affixed to said housing ground terminal within said hollow housing first section adapted to removably receive a surge arrester means therein;

F. said surge arrester means having at least a pair of electrode terminals and a ground terminal, said surge arrester means ground terminal being in electrically conductive contact with said housing first section ground terminal, each one of said pair of surge arrester electrode terminals being in electrically conductive contact with one of said pair of line terminals;

G. a pair of back-up surge protector means, each having a first terminal and a second terminal, said first terminal of said back-up surge protector means being connected to said first section ground terminal and said second terminal of said back-up surge protector means being connected to one of said surge arrestor means electrodes.

2. A combined overvoltage station protector apparatus having maintenance termination and a half ringer circuit arrangement disposed therein, according to claim 1, wherein said surge arrester means is a three terminal gas tube.

3. A combined overvoltage station protector apparatus having maintenance termination and a half ringer circuit arrangement disposed therein, according to claim 1, wherein said surge arrester means is an assembly which includes a pair of solid state devices each having one terminal thereof connected together to form a three terminal solid state device.

4. A combined overvoltage station protector apparatus having maintenance termination and a half ringer circuit arrangement disposed therein, according to claim 1, wherein the series electrical path from one of said input line terminals to an output line terminal includes a bi-polar thyristor.

5. A combined overvoltage station protector apparatus having maintenance termination and a half ringer circuit arrangement disposed therein, according to claim 1, wherein the electrical path from one of said input line terminals to an output line terminal further includes a breakover trigger device for said bi-polar thyristor.

6. A combined overvoltage station protector apparatus having maintenance termination and a half ringer circuit arrangement disposed therein, according to claim 1, and further including potting compound disposed within said open areas of said hollow housing.

7. A combined overvoltage station protector apparatus having maintenance termination and a half ringer circuit arrangement disposed therein, according to claim 1, and further including a cover disposed on the bottom of said hollow housing.

8. A combined overvoltage station protector apparatus having maintenance termination and a half ringer circuit arrangement disposed therein, according to claim 1, wherein the series electrical path from one of said input line terminals to the other of said input line terminal includes at least a resistor and a voltage breakover device.

9. A combined overvoltage station protector apparatus having maintenance termination and a half ringer circuit arrangement disposed therein, according to claim 8, wherein the series electrical path from one of said input line terminals to the other of said input line terminal further includes a capacitor and an oppositely poled breakover device.

10. A combined overvoltage station protector apparatus having maintenance termination and a half ringer circuit arrangement disposed therein, according to claim 1, wherein the series electrical path from one of said output line terminals to the other of said output line terminal includes at least a resistor and a voltage breakover device.

11. A combined overvoltage station protector apparatus having maintenance termination and a half ringer circuit arrangement disposed therein, according to claim 10, wherein the series electrical path from one of said output line terminals to the other of said output line terminal further includes an oppositely poled diode.

12. A combined overvoltage station protector apparatus having maintenance termination and a half ringer circuit arrangement disposed therein, according to claim 1, wherein said holding assembly means comprises:

A. first and second bracket means, each one of said bracket means extending towards and affixed to one of said pair of input line terminals on one end being in electrically conductive contact therewith and adapted to receive one electrode of said surge arrester means on the other end; and B. third bracket means, said third bracket means being adapted to receive said surge arrester means therein and provide electrically conductive contact between said first section housing ground terminal and said surge arrester ground terminal.

13. A combined overvoltage station protector apparatus having maintenance termination and a half ringer circuit arrangement disposed therein, according to claim 12, wherein each one of said first and second bracket means, has affixed thereon a back-up surge protector comprising:

A. a first electrically conductive layer having a generally centrally disposed through aperture;

B. a non-conductive layer having a generally centrally disposed through aperture and additional apertures;

C. a second electrically conductive layer having a generally centrally disposed through aperture;

D. hollow insulation means inserted into said generally centrally disposed through apertures of said first and second conductive layers and said non-conductive layer sandwiching said non-conductive layer therebetween;

E. means adapted to be received into said hollow insulation means for holding said conducting layers and said non-conducting together and affixing said layers to each of said first and second bracket means; and F. electrically conductive jumper means being in electrically conductive contact with said housing ground terminal and in electrically conductive contact with said first electrically conductive layer.

14. A combined overvoltage station protector apparatus having maintenance termination and a half ringer circuit arrangement disposed therein, according to claim 13, wherein said non-conducting layer has four through apertures in addition to said generally disposed aperture.

15. A combined overvoltage station protector apparatus having maintenance termination and a half ringer circuit arrangement disposed therein, according to claim 13, wherein said means adapted to be received into said hollow insulation means for holding said conducting layers and said non-conducting together and affixing said layers to each of said first and second bracket means is a metal rivet.

* * * * *